(No Model.)

S. H. KIMBALL.
SPOON.

No. 527,115.

Patented Oct. 9, 1894.

WITNESSES:
Cel B Burdine
G. Arthur Pennington

INVENTOR
Sophie H. Kimball,
BY
Jos. H. Hunter
ATTORNEY.

UNITED STATES PATENT OFFICE.

SOPHIE H. KIMBALL, OF CERES, NEW YORK.

SPOON.

SPECIFICATION forming part of Letters Patent No. 527,115, dated October 9, 1894.

Application filed March 20, 1894. Serial No. 504,438. (No model.)

*To all whom it may concern:*

Be it known that I, SOPHIE H. KIMBALL, a citizen of the United States, residing at Ceres, in the county of Allegany and State of New York, have invented certain new and useful Improvements in Spoons, of which the following is a specification, reference being had therein to the accompanying drawings.

This invention relates to an improvement in spoons and it consists in the construction and arrangement of the parts thereof as hereinafter described and definitely pointed out in the claim.

The object of the invention is the provision of a spoon adapted more especially for children's use, and which will be adapted for easy and convenient handling, and which will be so arranged that the bowl will be substantially in a horizontal position when the spoon is laid down with the "dish" of the bowl upward. These objects are attained by the construction illustrated in the accompanying drawings wherein like letters of reference indicate corresponding parts in the several views, and in which—

Figure 1:
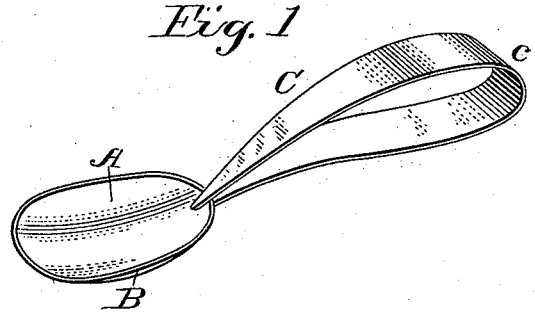
Figure 2:
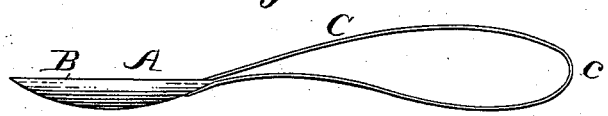
Figure 3:
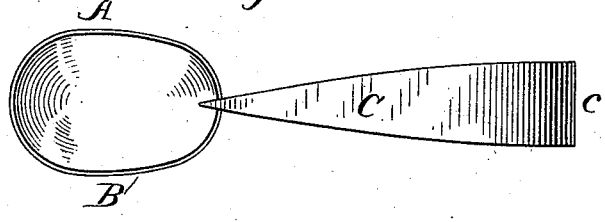

Figure 1 is a perspective view of a spoon embodying the invention. Fig. 2 is a side elevation, and Fig. 3 is a top plan view.

In the drawings A represents the bowl having its front or outer edge B curved laterally from the sides, to form a blunt broad edge, for the purpose of enabling the child to more easily get the victuals on the spoon. The sides of the bowl are more nearly straight and the rear edge is rounded or curved.

From the center of the upper face of the rear the bowl extends the uppermost portion of the handle C, the same being secured to the bowl, and extending up at an incline and looped down and carried back with a slight upward curve as shown in Fig. 2 and directly below the upper portion and secured to the under side of the bowl. The handle C is tapered from its center to the ends, the outer portion C being wide and preferably flat.

By the above described construction it will be seen that the child can secure a sure purchase on the handle by passing its fingers through the loop, and further by this form of handle, the spoon is less liable to turn in the child's hand.

By grasping the loop a firm hold is also afforded, and as the spoon is placed on the table the bowl will be held in a practically horizontal position by the lower wide portion of the looped handle. The upward curve of the lower portion of the handle carries the same in proximity to the end of the upper portion and forms at that point a grasping portion, so that a child can either handle the spoon by grasping the upper portion of the loop or the portion adjacent to the bowl.

It is evident that slight changes can be made in the particular form described without departing from the principle of my invention.

Having thus described my invention, what I claim as new, and desire to secure by Letters Patent, is—

A spoon consisting of a bowl and a handle formed of a single metal strip diverging from its ends and forming a relatively broad central section bent at or near its center, the upper section carried upwardly and the lower section down and curved upwardly toward the bowl, the opposite ends being secured to the bowl adjacent to each other whereby a grasping portion is formed at or near the bowl and by the upper section of the handle.

In testimony whereof I affix my signature in presence of two witnesses.

SOPHIE H. KIMBALL.

Witnesses:
C. H. GLEASON,
A. KIMBALL.